United States Patent
Wang et al.

(10) Patent No.: US 11,859,093 B2
(45) Date of Patent: *Jan. 2, 2024

(54) PRINTABLE NON-CURABLE THIXOTROPIC HOT MELT COMPOSITION

(71) Applicant: TE Connectivity Solutions GMBH, Schaffhausen (CH)

(72) Inventors: Lei Wang, San Jose, CA (US); Martin W Bayes, Hopkinton, MA (US); Ting Gao, Palo Alto, CA (US); Kenneth Seufer, Kernersville, NC (US); Philip Singer, Cary, NC (US); James Zeigler, Harrisburg, PA (US)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/701,814

(22) Filed: Mar. 23, 2022

(65) Prior Publication Data

US 2022/0306884 A1 Sep. 29, 2022

Related U.S. Application Data

(63) Continuation-in-part of application No. 17/213,950, filed on Mar. 26, 2021.

(51) Int. Cl.
| | | |
|---|---|---|
| *C09D 11/34* | (2014.01) | |
| *B41M 5/00* | (2006.01) | |
| *C09D 11/03* | (2014.01) | |
| *C09D 11/12* | (2006.01) | |
| *C09D 11/38* | (2014.01) | |

(52) U.S. Cl.
CPC ............ *C09D 11/34* (2013.01); *B41M 5/0023* (2013.01); *C09D 11/03* (2013.01); *C09D 11/12* (2013.01); *C09D 11/38* (2013.01)

(58) Field of Classification Search
CPC ......... C09D 11/34; C09D 11/12; C09D 11/38; C08K 3/36; C08L 91/06; C23F 1/02
See application file for complete search history.

(56) References Cited

U.S. PATENT DOCUMENTS

| | | | |
|---|---|---|---|
| 3,644,180 A | 2/1972 | Burock et al. | |
| 4,877,644 A | 10/1989 | Wu et al. | |
| 5,624,483 A * | 4/1997 | Fujioka | C09D 11/34 106/31.62 |
| 6,713,529 B2 | 3/2004 | Sime et al. | |
| 8,252,506 B2 | 8/2012 | Cheetham et al. | |
| 8,999,185 B2 | 4/2015 | Caiger | |
| 9,200,185 B2 | 12/2015 | Knutson et al. | |
| 10,392,537 B2 | 8/2019 | Kauffman et al. | |
| 10,844,253 B2 | 11/2020 | Kauffman et al. | |
| 2007/0254978 A1 * | 11/2007 | Odell | C09D 11/101 522/178 |
| 2010/0028537 A1 | 2/2010 | Goredema et al. | |
| 2010/0129754 A1 * | 5/2010 | Cheetham | C09D 11/101 430/323 |
| 2013/0299449 A1 * | 11/2013 | Ketelaars | H05K 3/0076 427/256 |
| 2014/0299366 A1 * | 10/2014 | Wetjens | C09D 11/34 216/13 |
| 2015/0053643 A1 * | 2/2015 | Balantrapu | H05K 3/181 522/182 |
| 2015/0322311 A1 * | 11/2015 | Suen | C09J 171/02 524/223 |
| 2016/0090491 A1 * | 3/2016 | Benjamin | C09D 11/12 347/88 |

FOREIGN PATENT DOCUMENTS

| | | |
|---|---|---|
| EP | 1090079 A1 | 4/2001 |
| EP | 2154211 A1 | 2/2010 |
| KR | 10-2006-0132526 A | 12/2006 |

OTHER PUBLICATIONS

International Search Report for International Application No. PCT/IB2022/052725, dated Jul. 22, 2022.

* cited by examiner

*Primary Examiner* — Ellen M McAvoy

(57) ABSTRACT

A printable non-curable thixotropic hot melt composition is described. The composition comprises non-curable holt melt waxes transformed into a thixotropic composition by the use of thickeners. The thickeners can be added separately to the hot melt wax or formed in-situ, either before or after application to the substrate. A process of forming such printable non-curable thixotropic hot melt composition is described.

13 Claims, No Drawings

PRINTABLE NON-CURABLE THIXOTROPIC HOT MELT COMPOSITION

RELATED APPLICATIONS

This application is a continuation-in-part of co-pending, commonly assigned U.S. patent application Ser. No. 17/213,950, filed on Mar. 26, 2021, the disclosure of which is incorporated herein by reference.

FIELD OF THE INVENTION

The present invention is directed to a non-curable thixotropic hot melt composition which can be used as a resist. In particular, the invention is directed to such a non-curable hot melt thixotropic composition comprising waxes and thickeners. The resist can be used in an etching or plating process.

BACKGROUND OF THE INVENTION

The present invention is directed to hot melt compositions which can be used as plating resists and etch resists. Resists are used to produce patterns on substrates. Typically, a material is applied to the substrate. Various application methods have been developed to apply such resist materials to substrates. For example, the resist can be selectively applied by methods, such as but not limited to controlled depth dipping, ink jet printing, gravure printing, pad printing, and screen printing. In each of these examples, the resist is applied to a desired area of the substrate and then fixed in place on the substrate by means including solvent evaporation, active heat to cross link the resist or by actinic radiation cure. Alternatively, the resist can be applied to a substrate with the subsequent modification of the covered areas. Examples of this include photoresist systems which rely on selective exposure of the initial resist with actinic radiation through a mask followed by a development step or non-photosensitive systems in which selective removal can be done using ablation or manually using scraping tools. The substrate is then plated with a metal in a plating bath or exposed to an etching process. The resist can then be removed after the plating or etching process in a stripping bath. The resist must be able to withstand the plating or etching process bath but also be readily removed in the stripping bath.

U.S. Pat. No. 3,644,180 describes the chemical treatment of surfaces to selected portions of the surface by applying inorganic resists to the surface in a desired pattern. Silicon dioxide is deposited at a low temperature on a titanium surface surrounding a platinum interconnection pattern on a silicon semiconductor.

U.S. Pat. No. 4,877,644 describes a method for the selective plating of a metal substrate on which a thin polymeric plating resist is applied, followed by the selective removal of the resist to expose portions of the substrate to plating. Laser ablation is used to selectively remove the resist prior to plating.

U.S. Pat. No. 6,713,529 B2 describes a hot melt ink for use with an ink jet printing apparatus which is a liquid at about 100° C. to about 130° C. The ink solidifies to a two-phase solid having an elastic phase and a crystalline phase. The ink is formulated from a carrier, a first plasticizer, a flow additive and a colorant.

EP 1090079 B1 discloses a radiation curable composition suitable for use in hot melt inkjet printers. The composition comprises 35-98% by weight of a radiation curable material and a thickener. The composition is a thixotropic paste at 20° C. The composition also has a viscosity of less than 25 centipoise at a temperature in the range of from 40° C. to 130° C.

A process for etching or plating is described in U.S. Pat. No. 8,999,185 B2. The process comprises the steps of ink jet printing an alkali removable water insoluble hot melt ink jet onto a substrate to form a resist image. The substrate is etched or plated in an aqueous medium. The resist image is then removed with an aqueous alkali.

U.S. Pat. No. 8,252,506 B2 describes hot melt compositions which include acid waxes and acrylate functional monomers free of acid groups. Upon application of actinic radiation, the hot melt compositions cure to form a resist. The resist can be used as an etch resist or a plating resist. The resist is then stripped from the substrate. The hot melt compositions can be used in the manufacture of printed circuit boards, optoelectronic and photovoltaic devices.

UV curable hot melt resists have been developed for use in inkjet printing processes. Hot melt resists are solids at ambient temperatures and turn to liquids during inkjet printing processing at high temperature, which are above the melting temperatures of the hot melt resists. As inkjet printers eject the droplets of liquid hot melt resist to the surface of plating parts, the droplets form pre-designed patterns as the droplets cool down on the surface. The UV light is then applied to cure these hot melt resists to form the protective masks. Many of the hot melt resist formulations comprise UV curable monomers and waxes with acid functional groups. The use of the hot melt resists is advantageous over other types of resists because the inkjet printer can easily print pre-designed patterns digitally with high resolutions, can easily be applied on parts with complex shapes, and can eliminate the need for the laser ablation process. However, such hot melt resists still involve a UV curing process and the need for special UV equipment to be used in the process.

Non-curable hot melt resists have been used as plating masks. Many hot melt resist waxes are compatible with high efficiency plating processes but do not work as well with low efficiency plating process such as gold plating. Low efficiency gold plating can generate gases which can cause damage to the edges of resist features masks, resulting in plating failures. Broken edges during plating can also be due to the high flowability of the hot melt resist on plating surfaces, which leads to thin edge formation during printing.

The non-curable hot melt waxes need to have low viscosities under printing temperatures, which requires them to have low molecular weights. The mechanical strength of these low molecular weight waxes results in the waxes being very brittle. The brittleness of the waxes and thin edges of the wax masks result in the edges of the mask having very limited resistance to the forces from gas evolution during the plating process. To solve this problem of brittleness, several approaches have been proposed, such as improving the strength or toughness of the wax as well as pre-cooling the plating parts to limit wax flowability after the parts are printed. However, improving the strength or toughness of the waxes may lead to printing viscosity increases as well as increasing the difficulty of stripping the waxes after the plating process. Pre-cooling the plating parts requires additional equipment and changes in the process.

It would, therefore, be beneficial to provide a non-curable hot melt thixotropic composition which eliminates the problems described above. In particular, it would be beneficial to provide non-curable thixotropic hot melt compositions which can be used as resists.

SUMMARY OF THE INVENTION

An embodiment is directed to a printable non-curable thixotropic hot melt wax used for resists. The printable non-curable thixotropic hot melt wax includes one or more waxes with an acid functional group, an anhydride group or an amine functional group. The printable non-curable thixotropic hot melt wax also includes a thickener comprising fumed silica, polymeric particles, or metallic complexes.

An embodiment is directed to a printable non-curable thixotropic hot melt wax used for resists having a mixture of waxes and a thickener. The mixture of waxes includes waxes having an acid functional group, an anhydride group, or an amine functional group. The thickener is miscible or partially miscible with the mixture of waxes at a temperature sufficiently high to melt the thickener.

An embodiment is also directed to a process to form fine and uniform thickener particles in a mixture of a wax and a thickener component resulting in a non-curable thixotropic hot melt composition. The process includes heating the mixture of wax and thickener component to achieve complete mixing of the wax and thickener component; and cooling down the mixture under high speed rotation, stirring, shaking, vibration or shear, resulting in the precipitation of the thickener materials to form fine particles in the composition.

Yet another embodiment is provided in which the printable non-curable thixotropic wax is used as either an etching resist or plating resist in which the thickener precipitates after the mixture is applied to the substrate.

Other features and advantages of the present invention will be apparent from the following more detailed description of the illustrative embodiment, which illustrates, by way of example, the principles of the invention.

DETAILED DESCRIPTION OF THE INVENTION

In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

The invention is directed to a non-curable, thixotropic hot melt composition formed by combining a hot melt wax with a thickener. The wax is converted into a thixotropic composition which can be used as a resist. The non-curable, thixotropic hot melt composition is preferably printable. In this specification, the term "non-curable" includes any composition that cannot be cured under conventional conditions, including but not limited to exposure to UV light, heat or moisture.

Illustrative embodiments of the invention are directed to converting non-Newtonian hot melt waxes into printable non-curable thixotropic hot melt waxes which are used as resists by adding the thickeners to such waxes. By converting these non-curable waxes into non-curable thixotropic hot melt waxes, they can still be printable under high shear rate and printing temperatures. However, the droplets of these printable non-curable thixotropic hot melt waxes will not flow and will not form thin edges after application to the parts due to their high viscosity under low shear rate.

Examples of suitable non-Newtonian non-curable hot melt waxes which can be used in the instant invention, include, but are not limited to, LS2535 wax or LS2538 wax, both manufactured by Koster Keunen, Inc. Preferably, these waxes are blends of polyolefin waxes having one or more types of acid functional group. Many other non-curable hot melt waxes which are printable can also be used in the hot melt non-curable thixotropic composition of the instant invention. For example, for acidic gold and palladium plating waxes, the waxes must have an acid functional group or anhydride functional group so they can withstand the acidic plating solution but can be stripped off in a basic (or alkaline) solution after plating. Examples of suitable non-curable hot melt waxes to be used as gold and palladium plating waxes include but are not limited to Licowax S flakes acid wax from Clariant AG and stearic acid. For alkaline plating solutions such as cyanide silver plating waxes, the waxes must have an amine functional group so they can withstand the alkaline plating solution and be stripped off in acid solution after plating. Examples of suitable non-curable hot melt waxes that can be used in silver plating include but are not limited to octadecylamine and Fentamine DA102 from Solvay S.A. Mixtures of the various waxes can be used provided the desired properties of the thixotropic hot melt composition are obtained.

Thickeners such as fumed silica, polymeric particles, or metal complexes can be added to the wax to form the printable non-curable thixotropic hot melt composition of this invention. For a composition which is used in inkjet printing, the preferred size of the thickener particles is less than one tenth of the nozzle size of the inkjet printer. In illustrative embodiments, the size of the thickener particles is ten microns or less. Any thickener that exhibits thickening efficiency and has the small size required may be used. The amount by weight of fillers can be between approximately 0.50% to approximately 30% by weight of the total composition.

In one example, a non-Newtonian non-curable hot melt wax (LS2535) was converted into a non-curable thixotropic hot melt wax by adding fumed silica to the wax. Examples of suitable fumed silicas include but are not limited to, Aerosil 200 and Aerosil R974, both manufactured by Evonik Industries. The sizes of fumed silica particles are generally sub-micron. Such thickeners can be between approximately 0.50% to approximately 5% by weight of the total composition. The resultant non-curable thixotropic wax exhibited strong shear thinning character. The resultant non-curable thixotropic hot melt waxes have high viscosities under low shear rate and slightly higher viscosities under high shear rate when compared with a control sample which is the formulation without the thickener. The viscosities of the resultant non-curable thixotropic hot melt wax can be further lowered under higher shear rate present in the printer. The viscosity of the resultant non-curable thixotropic hot melt wax can also be adjusted by the addition of low viscosity acid waxes such as stearic acid. The amount of the low viscosity acid wax to be added is well within the scope of one of ordinary skill in the art.

Fumed silica can form aggregations if processed in an inkjet printer during the dispersion process due to its high surface area and surface property compatibility to the plating wax. Additionally, the fumed silica can precipitate from the composition. Therefore, it is desirable to use a fumed silica which is highly compatible with the wax used.

Polymeric particles or micron size powder products may also be used as thickeners in the composition of the instant invention. One or more types of polymeric particles may be used. Preferably the polymeric particles are polyolefin particles. An example of polyolefin particles are polyethylene particles. The polymeric particles must have high enough melting points to be above the mixing and printing temperature of the composition so as to survive the mixing and printing process. Generally, small particle sizes for the polymeric particles or powder products give better thickening and thixotropic performance. For polymeric particles, precipitation and low shear thinning efficiency may need to be considered. An example of a polymeric particle is MPP-635XF high molecular weight polyethylene wax from Micro Powders Inc. Preferably, the mean particle size is from about 4 to about 6 microns. In one embodiment, the polymeric micron powder product used as a thickener is between approximately 5% to approximately 20% by weight of the composition.

In addition to the above thickeners, metallic complexes can also be used to transform the waxes to the printable non-curable hot melt compositions of the instant invention. Examples of such include but are not limited to lithium complexes and aluminum complexes.

Other thickeners can be incorporated into the non-curable thixotropic hot melt composition of the instant invention. Examples of such other thickeners include, but are not limited to, aerogel, carbon nanotubes, graphene and other inorganic or organic micron or nano particles. These thickeners may also be used so long as the hot melt composition retains its desired properties and they can be dispersed in the wax to form a thixotropic composition.

Other additives may be included in the composition in conventional amounts provided that the additives do not detract from the thixotropic properties of the composition. Examples of such additives include dyes, opacifiers, antistatic agents, foaming agents, plasticizers, binders, antioxidants, surfactants, antistatic agents, metal adhesion agents and stabilizers. Such additives may be included in conventional amounts.

Another embodiment of the instant invention uses the in-situ formation of thickeners in a hot melt wax, to form the non-curable thixotropic hot melt composition. In this specific embodiment, a thickener component is used to form the thickener and therefore provide the thixotropic properties to the wax. In this particular embodiment, the thickener component must have a different solubility than the rest of the composition under different temperatures using the process of the instant invention. The thickener component must be miscible or partially miscible with the other components of the composition. The thickener component, the wax and other components of the composition are mixed at a temperature to achieve complete mixing. The temperature can be easily chosen by one of ordinary skill in the art in this embodiment dealing with the in-situ formation of thickeners. When the composition is cooled to a lower temperature with vigorous stirring or other agitation, the thickener component precipitates to form fine particles and thereby renders the composition thixotropic.

The amount by weight of thickener component of the total composition is between approximately 0.5% to approximately 20% by weight, preferably between approximately 1% to approximately 5% by weight. Examples of thickener components that can be used in the instant invention include but are not limited to Licocene PP 6102 granules from Clariant A.G. (low viscous metallocene catalyzed polypropylene wax), Licocene PP MA 6252 granules from Clariant A.G. (maleic anhydride grafted polypropylene wax), A-C 540 ethylene acrylic acid copolymer from Honeywell International, Inc. and A-C 325 high density oxidized polyethylene homopolymer from Honeywell International, Inc.

To obtain the in-situ formation of the thickener, the thickener component and the hot melt wax are heated to a temperature that is sufficiently high so as to achieve mixing of the thickener component and the hot melt wax. In an embodiment, the mixing temperature is approximately 10° C. to approximately 30° C. above the melting temperature of thickener component. The heating time depends upon how long it takes the thickener component and plating wax to be completely mixed.

With the thickener component fully mixed with the hot melt wax, the composition is cooled down. As the mixture is cooled down, it is subjected to high speed rotation, stirring, shaking or vibration, for example, by the use of a speed mixer or other equipment. In an illustrative embodiment, the mixture is cooled down to a temperature which is approximately 10° C. to approximately 30° C. below the melting temperature of the wax.

Under these conditions, the thickener component will precipitate from the wax to form fine particles due to its reduced solubility. As a result, small solid particles down to micron size are formed due to vigorous shear or shaking before the composition solidifies. The solid particles function as thickeners for the wax forming the non-curable thixotropic hot melt composition of the instant invention.

In another embodiment of the invention, thickener particles are uniformly dispersed in a mixture of hot melt waxes. Preferably in this embodiment, the thickener particles are organic. The thickener, the hot melt wax and any other additives are mixed at a temperature to achieve complete mixing. Generally, the temperature of mixing is determined by the component in the mixture with highest melting point. Preferably, the composition is mixed at about 10 to about 50° C. above the melting temperature of the thickener. After being mixed, the composition is then deposited on the substrate. Preferably the composition is deposited on the substrate by an inkjet printer. After the composition is deposited, the thickener starts to precipitate and form small particles and converts the mixture into a thixotropic composition with reduced flowability, preventing formation of thin resist edges.

In this embodiment, the amount by weight of the thickener component of the total composition is between approximately 0.1% to about 20% by weight, preferably between approximately 1% to approximately 10% by weight. Examples of suitable thickeners to be used in this embodiment include polyethylene waxes. Preferably, the polyethylene waxes are lower molecular weight polyethylenes and have a molecular weight in the range of about 400 to about 1000. In addition, the melting point of the polyethylene wax used in this embodiment is between 70° C. to 110° C., preferably between 80° C. and 100° C. An example of a suitable polyethylene wax to be used in the instant invention is Polywax® wax, available from Baker Hughes, Inc.

Once the mixed composition is applied to the substrate, the thickener starts to precipitate as the composition cools and forms small particles due to its high crystallization temperature and limited solubility in the hot melt wax. These precipitated thickener particles convert the mixture containing the hot melt wax into a thixotropic hot melt composition with reduced flowability. This embodiment provides for improved printability of the printable non-curable thixotropic hot melt composition.

In yet another embodiment of the invention, a component is added to the wax to form a non-curable hot melt composition of the instant invention. The component is not miscible with the wax. This component is then dispersed to form fine particles under a sufficiently vigorous mixing process.

The printable non-curable thixotropic hot melt composition of the instant invention can be used as a resist. The resist can be used as an etch resist or a plating resist. In general, the resist is selectively deposited on a substrate. Hot melt compositions are typically applied by inkjet printers. In addition, the hot melt resist compositions of the instant invention can be applied using screen printing or by spray apparatus having nano- to macro-deposition capability. All of these are known methods in the art and can be used to apply the printable non-curable thixotropic hot melt composition of the instant invention to a substrate.

If used as an etch resist, the uncovered section of the substrate may be etched to a desired depth. The etchant does not remove the resist from the substrate during etching, therefore, the composition functions as an etch resist. The etch resist is then stripped from the substrate leaving a patterned substrate which can be further processed using conventional methods known in the art. In the alternative, the substrate may be plated with a metal to form a pattern on the substrate, thus the resist functions as a plating resist. The plating resist is then stripped from the substrate leaving a substrate with a metal pattern for further processing by conventional methods known in the art.

Etching can be done by methods known in the art appropriate to the material of which the substrate is composed. Typically, etching is done with acids, such as hydrofluoric acid, nitric acid, phosphoric acid, hydrochloric acid, organic acids such as carboxylic acids and mixtures thereof, or with industrial etches such as cupric chloride and ferric chloride. Such etches are well known in the art and may be obtained from the literature.

Etching is typically done at temperatures of 20° C. to 100° C., more typically from 25° C. to 60° C. Etching includes spraying or dipping the resist coated substrate with the etchant in either a vertical or horizontal position. Typically, spraying is done when the substrate is in the horizontal position. This allows for quicker removal of the etchant. The speed of etching may be accelerated by agitating the etchant, for example using sonic agitation or oscillating sprays. After the substrate has been treated with the etchant it is typically rinsed with water to remove traces of the etchant.

One or more metal layers may be deposited in the pattern formed on the substrate. Metals may be deposited electroless, electrolytically, by immersion or light induced plating. Conventional electroless, electrolytic and immersion baths and methods may be used to deposit metal or metal alloy layers. Many such baths are commercially available or described in the literature. Metals include but are not limited to noble and non-noble methods and their alloys. Examples of such suitable noble metals are gold, silver, platinum, palladium and their alloys. Examples of suitable non-noble metals are copper, nickel, cobalt, bismuth, zinc, indium, tin, and their alloys.

The hot melt composition wax can be used on various substrates, including but not limited to semiconductors, photovoltaic or solar cells, components for electronic devices such as lead frames and printed circuit boards, in metal finishing of parts and precision tooling.

After being deposited on the desired substrate as part of the plating process, the non-curable hot melt composition can be removed from the substrate using a stripping bath. For a resist that is stable in an acid plating bath, the resist would be strippable in an alkali stripping bath. For a resist that is stable in an alkaline plating bath, the resist would be strippable in an acidic stripping bath.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A printable non-curable thixotropic hot melt composition for use as a resist during a plating process comprising:
one or more hot melt waxes with an acid functional group, an anhydride group, or an amine functional group; and
a thickener comprising fumed silica, polymeric particles comprising polyolefin particles, or metallic complexes.

2. The printable non-curable thixotropic hot melt composition as set forth in claim 1, wherein the printable non-curable thixotropic hot melt composition can be stripped off in a bath during a plating process.

3. The printable non-curable thixotropic hot melt composition as set forth in claim 1, wherein the printable non-curable thixotropic hot melt composition has a melting temperature above 50° C. and below 90° C.

4. The printable non-curable thixotropic hot melt composition as set forth in claim 1, wherein the printable non-curable thixotropic hot melt composition is stable during said plating process and withstands the plating solution.

5. The printable non-curable thixotropic hot melt composition as set forth in claim 1, wherein said thickener has a particle size that is less than ten microns.

6. The printable non-curable thixotropic hot melt composition as set forth in claim 1, wherein the amount of thickener is between approximately 0.50% to approximately 30% by weight of said composition.

7. A printable non-curable thixotropic hot melt composition for use as a resist during a plating process which comprises:
one or more hot melt waxes with an acid functional group, an anhydride group, or an amine functional group; and
a thickener comprising polymeric particles comprising polyolefin particles.

8. The printable non-curable thixotropic hot melt composition of claim 7, wherein the amount of thickener is between approximately 0.1% by weight to approximately 20% by weight of the composition.

9. The printable non-curable thixotropic hot melt composition of claim 7, wherein said polymeric particles comprise polyethylene wax.

10. A process to form fine and uniformly dispersed thickener particles in a mixture of hot melt waxes resulting in a thixotropic composition comprising:
   heating the mixture of waxes and a thickener component to achieve complete mixing; and
   dispensing the mixture of hot melt waxes and thickener component onto a desired substrate, whereby the mixture is cooled and the thickener component precipitates to form a non-curable thixotropic hot melt composition.

11. A resist composition comprising a non-curable hot melt composition comprising
   one or more hot melt waxes with acid functional groups, anhydride groups or amine functional groups; and
   a thickener comprising polymeric particles comprising polyolefin particles.

12. The resist composition of claim 11, wherein said thickener comprises polyethylene wax.

13. A printable non-curable thixotropic hot melt composition used as an a etch resist comprising:
   one or more hot melt waxes with an acid functional group, an anhydride group, or an amine functional group;
   a thickener comprising fumed silica, polymeric particles, or metallic complexes.

* * * * *